No. 727,662. PATENTED MAY 12, 1903.
A. MEUSCHEL.
INDUCTION MOTOR FOR VARIABLE SPEEDS.
APPLICATION FILED OCT. 5, 1901.
NO MODEL. 2 SHEETS—SHEET 2.
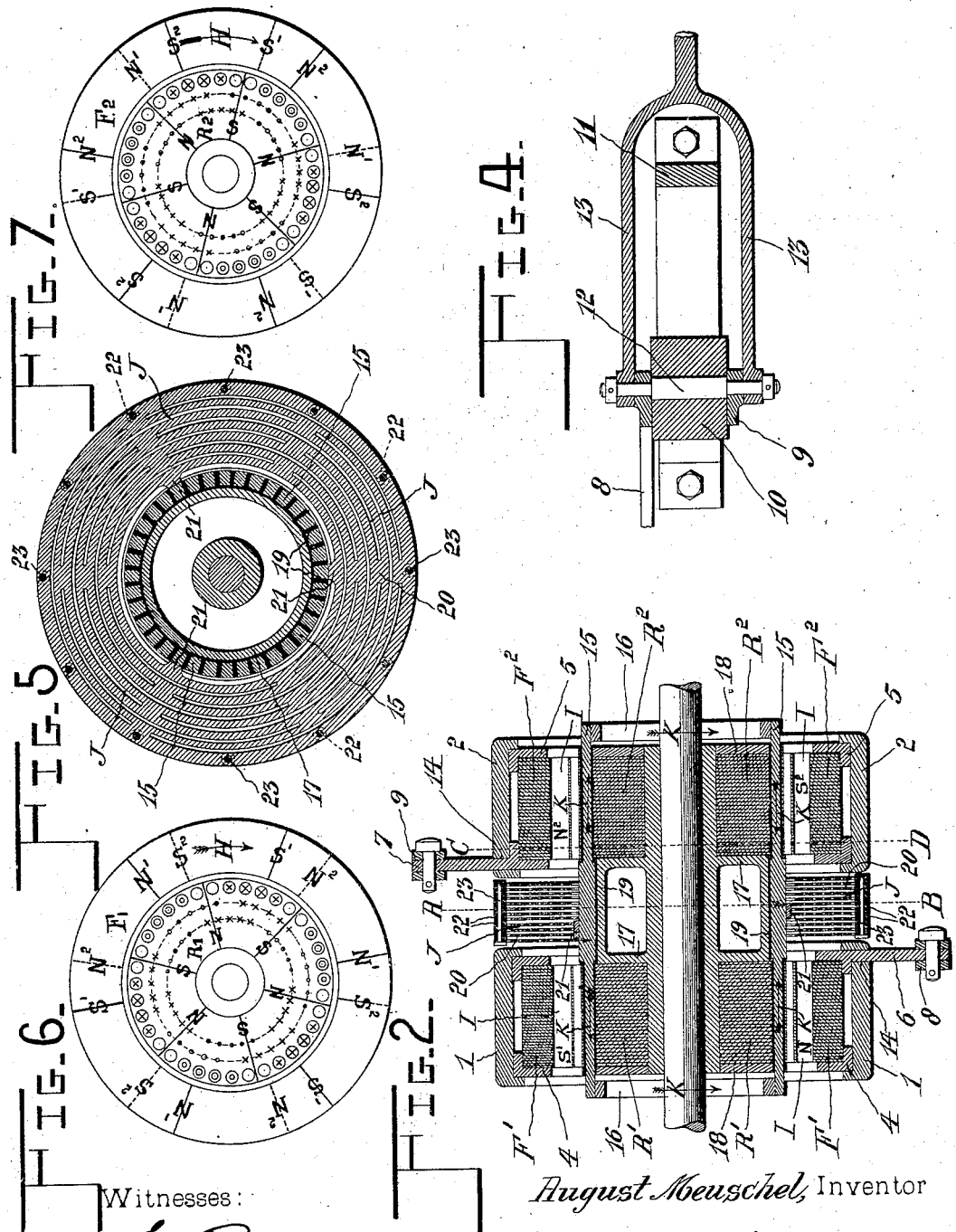
Witnesses: August Meuschel, Inventor
By Marion & Marion
Attorneys No. 727,662. Patented May 12, 1903.

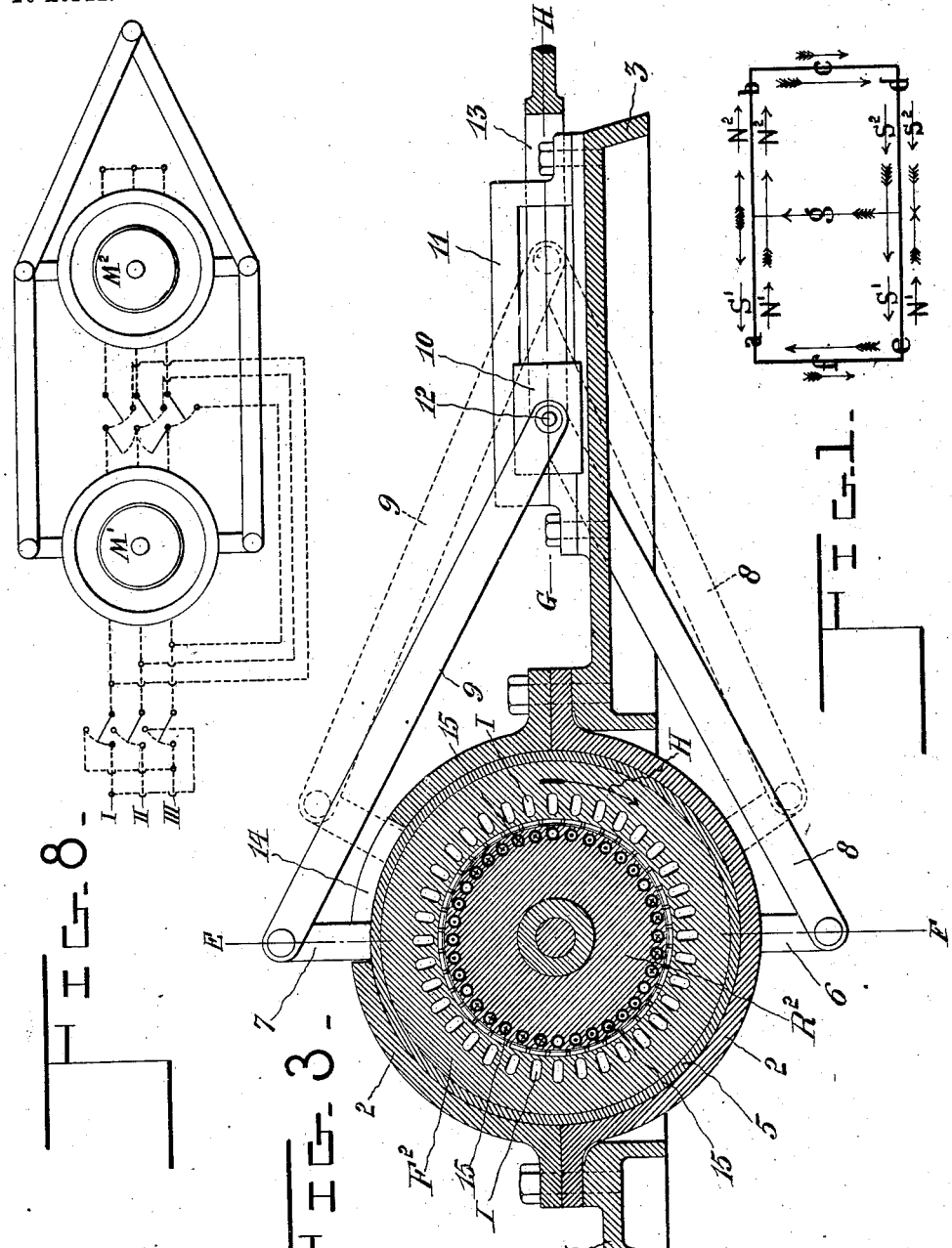

UNITED STATES PATENT OFFICE.

AUGUST MEUSCHEL, OF MONTREAL, CANADA, ASSIGNOR OF ONE-HALF TO GEORGE WETMORE COLLES, OF MONTREAL, CANADA.

INDUCTION-MOTOR FOR VARIABLE SPEEDS.

SPECIFICATION forming part of Letters Patent No. 727,662, dated May 12, 1903.

Application filed October 5, 1901. Serial No. 77,626. (No model.)

*To all whom it may concern:*

Be it known that I, AUGUST MEUSCHEL, a subject of the Emperor of Germany, residing at Montreal, Province of Quebec, Canada, have invented certain new and useful Improvements in Induction-Motors for Variable Speeds; and I do hereby declare that the following is a full, clear, and exact description of the invention, such as will enable others skilled in the art to which it appertains to make and use the same.

My invention relates generally to an induction-motor adapted to be operated by single-phase or polyphase electric currents.

More particularly, it relates to a variable-speed induction-motor which has its practical application in the propulsion of railway-cars, for example, and for other purposes where different speeds are necessary.

The objects of the invention are to provide a motor of the type named for great speed reduction and at the same time having a great starting torque without the use of slip-rings and brushes and to obtain intermediate speeds by passing only a small portion of the useful armature-current through a special armature resistance and full speed by armature-circuits of very low resistance, and consequently to furnish a variable-speed induction-motor with far better efficiency than those now on the market.

Other objects of the invention are convenience of operation and regulation and the overcoming of difficulties heretofore experienced in connection with such motors.

The organization comprising my invention, without regard to exact scope of novelty, which is set forth in the claims, consists of a low-resistance short-circuited armature, preferably of the squirrel-cage type, high-resistance bridges permanently electrically connecting the armature-conductors of opposed electrical value and located centrally to said conductors and carried by the armature, which is adapted to rotate, two rotary fields excited by polyphase currents or by a single-phase current in connection with a split-phase current and located, respectively, within inductive action of those two parts of the armature which are divided off by said resistances, the two fields having an equal number of poles of equal intensity, equal velocities, the same direction of rotation, and arranged in series or parallel circuits and the two fields being located side by side and surrounding the different portions of the armature, and means for angularly shifting the fields in their own planes relatively to each other from the position where unlike poles act on the same armature-bars to the position where like poles act on the same bars and to all intermediate positions. By switching polyphase currents or a single-phase current with a split phase onto the fields a cycle of polarities will ensue. The fields at starting should be in the position where unlike polarities are opposite the same armature-conductors. Consequently the electromotive forces produced by the fields in the individual armature-bars will be opposed and of equal magnitude, but will force currents through the bridges of high resistance dependent upon these resistances that will exert a starting torque between the fields and armature. Now if the separate fields are shifted to bring like poles over the same armature-bars unidirectional electromotive forces will feed currents directly through the armature-bars, the resistance-bridges being idle. A maximum speed is the result. Intermediate relative positions of the two fields will produce resultant currents in the armature-bars passing partly over the resistance-bridges and cause all degrees of speed variation. The shifting of the fields may be accomplished mechanically by hand or by any automatic devices or electrically by exciting them with currents of respectively lagging and leading phases of different degrees.

The invention consists more generally of a short-circuited squirrel-cage armature with conductors centrally permanently bridged by high resistances, separate alternating fields acting jointly on said conductors, and means for shifting the fields in the planes of rotation relatively to each other from a position where unlike poles are opposite the same bars to a position where like poles are opposite the same bars and to all intermediate positions.

Figure 1 is a diagram of one of the armature-circuits bridged by the resistance $g$ and accompanied by featherless arrows indicating electromotive forces produced by two fields N' and S' and N² S² inscribed thereon and by feathered arrows, representing the currents induced. The object of this diagram is especially to exhibit the principles involved in the gist of the invention. Fig. 2 is a longitudinal section at the line E F in Fig. 3, all unnecessary details—such as bearings, oil-cups, &c.—being omitted from all figures. Fig. 3 is a cross-section at the line C D in Fig. 2, the section being at right angles to the axis of the armature. The dotted lines indicate different phases of certain movable parts. Fig. 4 is a horizontal section at the line G H of the right-hand portion of Fig. 3 in the normal position of the parts shown. Fig. 5 is a cross-section at the line A B in Fig. 2, exhibiting especially the construction of a resistance-plate and its application to the armature. Figs. 6 and 7 are diagrams of the respective portions of the armature and the respective fields belonging to those portions. The dots indicate that the currents are coming toward the observer and the crosses indicate the reverse direction of current. Fig. 8 shows how two motors may be connected up as would be the case usually on cars.

$a\ b\ c\ d\ e\ f$ in Fig. 1 represent a closed circuit of low resistance, and $g$ a bridge of high resistance centrally connecting the side $a\ b$ with the side $e\ d$. $a$ and $b$ represent halves of the same armature-bar, and $e$ and $d$ represent halves of an opposite armature-bar, while $c$ and $f$ are conductors short-circuiting opposite ends of said bars. The resistance $g$ is indicated by a fine line, representing high resistance. First assume that the resistance $g$ is omitted. Let it be assumed also that electromotive forces are acting on $a$ and $e$ equal and opposed to those in $b$ and $d$, as indicated by the featherless arrows on the outside of the rectangle. Then will the electromotive forces neutralize each other, and no current can pass through the circuit. If the electromotive forces are not equal, a current proportional to their difference will pass through the circuit and will become a maximum when the electromotive forces in the portions $a$ and $e$ are in series with those in $b$ and $d$, as indicated by the featherless arrows inside the diagram. Now assume that the resistance $g$ is not omitted. Then if the electromotive forces in the portions $a$ and $e$ are equal and opposed to those in $b$ and $d$ the result will be a current through the resistance $g$, dividing and passing through two circuits—to wit, $g\ a\ f\ e$ and $g\ b\ c\ d$—as indicated by the feathered arrows on the outside of the rectangle. The magnitude of these currents will be dependent on the magnitude of the resistances of the bridge and the two circuits and the magnitude of the electromotive forces. If the electromotive forces are equal and in series, no current can possibly pass over the resistance-bridge, as the difference of potentials at its terminals is in this case zero, provided the resistance of the conductors $a\ f\ e$ is equal to that of $b\ c\ d$. All the current passing through the circuit $a\ b\ c\ d\ e\ f$ and indicated by the feathered arrows within the rectangle is now dependent on the magnitude of the resistance of said circuit, which is very low, and that of the electromotive forces. If the electromotive forces in $a$ and $e$ are different in magnitude from those in $b$ and $d$, however, only a portion of the resultant current in $a\ b\ c\ d\ e\ f$ will have to pass through the resistance.

I will now describe a machine in order to show how the invention may be carried into practice, though the mechanical construction may be of various design. In this instance I employ mechanical means for shifting the two fields, which are assumed to be wound for six poles each and excited by polyphase currents.

3 is a base-plate to which are bolted circular shells 1 and 2, formed in halves and serving as bearings for adjustable revolving fields F' F² of the usual type of stator, being formed of built-up sheet-iron stampings suitably clamped together in casings 4 and 5 and pierced by holes I for the coils wound for two or three phase currents for magnetizing the rotary fields, each having an equal number of poles, equal speeds, the same direction of rotation, and equal intensities. The fields may be connected up in series or parallel in such a manner that the same may be shifted without being disconnected from the circuit. Arms 6 and 7 extend from the respective fields F' and F², and they are connected by connecting-rods 8 and 9 to the reciprocating cross-head 10 by pivot-joints.

11 is a guide for the cross-head, 12 the pivot passing through the cross-head for the rods 8 and 9, and 13 an extension by which the cross-head may be moved to and fro for shifting the fields either by hand or by other means. The fields F' and F² have six poles each of equal velocities, the same direction of rotation, equal intensities, and may be generated by polyphase currents connected either in series or parallel. A movement of the cross-head 10 to its right-hand limit will turn one of the fields through thirty degrees in the direction of the hands of a clock and the other field through the same angle in the opposite direction and through intermediate angles from the starting position represented, where unlike poles of both fields confront each other. The maximum angle of relative displacement between the two fields should therefore be sixty degrees, when like poles will confront each other. To permit the movement of the arms 6 and 7, the shells 1 and 2 are provided with slots 14, one of which is seen in Fig. 3.

15 represents stout copper bars of a squirrel-cage armature, short-circuited at their ends by rings 16 and extending past both fields and within inductive action thereof.

The sheet-iron cores for the armature are R' and R², assembled on a spider 17 and held by end plates 18. The conductors 15 are properly insulated therefrom and from each other between R' and R², preferably by mica or micanite. Twelve resistance-plates 20 surround the central portion of the bars 15 between the fields and serve as resistance-bridges, heretofore alluded to, between the armature-bars. The bars are in this place between R' and R² square-shaped. Each plate is electrically connected by means of lugs 21 to three armature-bars of equal electrical potential one hundred and twenty degrees apart, because six poles constitute a field, it being understood that the number of points so connected is equal in each case to the number of pairs of poles of the field. The circuit through the plates is made long by means of long arc-shaped slots J, formed in the plates, alternating in position in the manner shown in Fig. 5. The plates are separated from each other at the sides by air-spaces; but their rims are all electrically connected together by washers 22 and bolts 23. The arrangement of these resistance-plates upon the outside of the armature and their large surface exposed to the air will serve as a means for cooling the plates, while the action of centrifugal force will throw off the heated air between the plates and, besides, cause air circulation between the rotors and stators.

I will now describe the operation. In order to start the motor, current is switched onto both fields when they are in the position represented in Figs. 2 and 3. The direction of field rotation is indicated by the arrow H. At a certain instant of the cycle the formation of the fields will be that which is indicated by N' S' and N² S² in Figs. 2 and 3. As the relative speed between the rotor and the rotating fields is at its maximum when the rotor is at standstill, large electromotive forces (indicated by arrows K in direction) will be generated in the armature-conductors; but they are opposed and only a limited current can pass through the plates 20 on account of their high resistance, or, in other words, there will be only limited currents in the armature-bars producing the rotor-fields required for starting the motor. The directions of the currents in the several armature-bars are exhibited in Fig. 3, where the dots indicate currents coming toward the observer and the crosses currents of the opposite direction in the right-hand halves of the bars 15 embedded in R², inasmuch as only F² and R² are visible in Fig. 3. The currents in the left-hand halves of the bars embedded in R' will have exactly opposite directions; but the starting torque will be exactly alike in magnitude and direction between both rotors and stators. The diagrams of Figs. 6 and 7 of F' R' and F² R², respectively, show what happens when the fields F' and F² have been shifted through a certain angle and the electromotive forces acting on the individual armature-bars are of different magnitude. The currents due to the difference of electromotive forces are shown in the innermost circles of the diagrams as of equal directions in both. They do not pass over the resistance-plates. The currents passing through these plates are due to opposed electromotive forces, and they are shown on the next circles of the diagrams as of opposite directions. When these currents, due to both actions, are of equal magnitude, as assumed in the diagrams, they give compounded the resultant currents marked on the conductors and the rotor-fields, as shown. By starting the motor with stator-fields displaced by a certain angle we may therefore obtain an increased starting torque, the armature-currents being nearly doubled in this instance. No attention has been given to armature reaction and self-induction in these diagrams in order to avoid complication in the explanation. After the motor has once started the angle of control may be increased in order to increase the speed in proportion. In the same measure as this angle is increased the current passing through the resistance-plates will decrease until it becomes zero, when the cross-head 10 has reached its limit on the right-hand side in Fig. 3 and like poles of the two fields are confronting each other. The motor will then run at its maximum speed, as any ordinary induction-motor having a squirrel-cage armature, because the two rotary fields will then act on every armature-bar with like poles. It becomes apparent now that this induction-motor will have better efficiency than those now on the market when starting and running at intermediate speeds, because only a portion of the effective armature-current will pass through special armature resistance and dissipate energy.

I claim as my invention—

1. In an electric motor, a pair of fields rotatably supported in the plane of rotation of the armature, a bar extending radially from each of said fields on opposite sides of the armature, and means attached to said bars for reciprocating the same whereby the relative positions of the fields may be adjusted.

2. In an electric motor, a pair of fields rotatably supported in the plane of rotation of the armature, a bar extending radially from each of said fields on opposite sides of the armature, a cross-head slidable in guides, and link-rods attached to the cross-head and each of said bars whereby by sliding the cross-head the position of the fields will be adjusted relatively to each other.

3. In an electric motor, a pair of cylindrical shells, fields rotatably mounted therein, bars or lugs extending radially from said fields on opposite sides of the armature, and means attached to the outer ends of said bars to reciprocate the same in opposite directions to adjust the relative positions of the fields.

4. In an electric motor, a pair of fields, a cylindrical shell in which one of said fields is rotatably mounted, a bar or lug extending radially from said rotatably-mounted field, and means for reciprocating its outer end to adjust the field relatively to the other field.

5. In an electric motor, a pair of cylindrical shells, a field rotatably mounted in each of said shells, a bar or lug extending outwardly from each field, a cross-head slidable at right angles to said bars, and connections between the outer ends of said bars and said cross-head for adjusting the relative positions of the fields.

6. In an electric motor, a pair of cylindrical shells, a field rotatably mounted in each of said shells, a bar or lug extending outwardly from each field, a cross-head slidable at right angles to said bars, connections between the outer ends of said bars and said cross-head for adjusting the relative positions of the fields, and means attached to said cross-head whereby the latter may be reciprocated.

7. In an electric motor, an armature having conductors on the surface thereof connected together at each end of the armature, and a conductor of high resistance connecting the centers of said conductors to each other, said resistance consisting of a series of annular metallic plates encircling the armature.

8. In an electric motor, an armature having conductors on the surface thereof connected together at each end of the armature, and a conductor of high resistance connecting the centers of said conductors, said resistance consisting of a series of metallic plates encircling the armature and having concentric arc-shaped slots therein and all electrically connected together at their outer circumference.

9. In an electric motor, an armature having conductors on the surface thereof connected together at each end of the armature, and a conductor of high resistance connecting the centers of said conductors to each other, said resistance consisting of a series of coaxial metallic plates, the respective plates being connected to the successive bars of the armature and all the plates being electrically connected together at the opposite end of a radius.

10. In an electric motor, an armature having conductors on the surface thereof connected together at each end of the armature, and a conductor of high resistance connecting the centers of said conductors to each other, said resistance consisting of a series of annular plates surrounding the armature and having arc-shaped concentric slots therein and electrically insulated from each other at their sides but connected together at their outer circumference.

11. In an electric motor, an armature having conductors on the surface thereof connected together at each end of the armature, and a conductor of high resistance connecting the centers of said conductors to each other, said resistance consisting of a series of annular plates surrounding the center of the armature and spaced apart to leave air-spaces therebetween and bolted together at their outer circumference.

12. In an electric motor, an armature having conductors on the surface thereof connected together at each end of the armature, and a conductor of high resistance connecting the centers of said conductors to each other, said resistance consisting of a series of plates connected to the respective bars of the armature at the center thereof and spaced apart to leave air-spaces therebetween and bolted together at the opposite end of a radius.

13. In an electric motor, an armature having conductors on the surface thereof connected together at each end of the armature, and a conductor of high resistance connecting the centers of said conductors to each other, said resistance consisting of a series of annular plates surrounding the armature and connected to the respective armature-bars, and having arc-shaped concentric slots therein staggered with respect to each other so as to increase the length of the path of the current, said plates being spaced apart with respect to each other so as to leave air-spaces between them and connected together both electrically and mechanically at their outer circumference.

14. In an electric induction-motor, the combination with a pair of fields rotatable with respect to each other in the plane of rotation of the armature, and an armature having conductors on the surface thereof connected together at their ends and in inductive relation to both of said fields, said armature having at its center a series of plates connected to the respective conductors of the armature and forming a connection of high resistance for said bars between the two fields.

15. In an electric induction-motor, a pair of fields rotatably mounted with respect to each other in the plane of rotation of the armature, an armature having conductors on the surface thereof connected together at each end of the armature, and a series of plates centrally surrounding the armature between the said fields and electrically connected to the successive armature-conductors, whereby to form a connection of high resistance for the centers of said bars, and simultaneously, ventilating means for the motor.

16. In an electric induction-motor, a pair of cylindrical shells surrounding the armature, a magnetic field mounted in each of said shells, a bar or lug extending radially from each field at opposite sides of the armature, and means connected to the outer ends of said lugs for rotating the fields relatively to each other, in combination with an armature in inductive relation with said fields having conductors thereon, and a conductor of high resistance centrally connecting the armature-conductors and extending outwardly from the armature and between the two fields, whereby to form ventilating means and to produce a current of air inwardly between the fields and the armature and outwardly between the two fields.

17. In an electric induction-motor, the combination of a pair of stators having rotary magnetic fields mounted therein, a rotor of the squirrel-cage type subjected to the inductive action of the two stators, and a conductor of high resistance centrally connecting the bars of said rotor and rotatable therewith and extending between the two stators, said conductors comprising a series of plates having arc-shaped concentric slots therein and spaced apart to leave air-spaces between them and electrically connected at their outer circumference, each plate being connected to the bars of said rotor which are of equal electrical potential and the successive plates being connected to bars of different potential.

In witness whereof I have hereunto set my hand in the presence of two witnesses.

AUGUST MEUSCHEL.

Witnesses:
J. A. MARION,
T. MYNARD.